Feb. 23, 1932.  F. A. APGAR  1,846,666
PRODUCTION OF ALKYL ESTERS OF SULPHURIC ACID
Filed Dec. 16, 1929
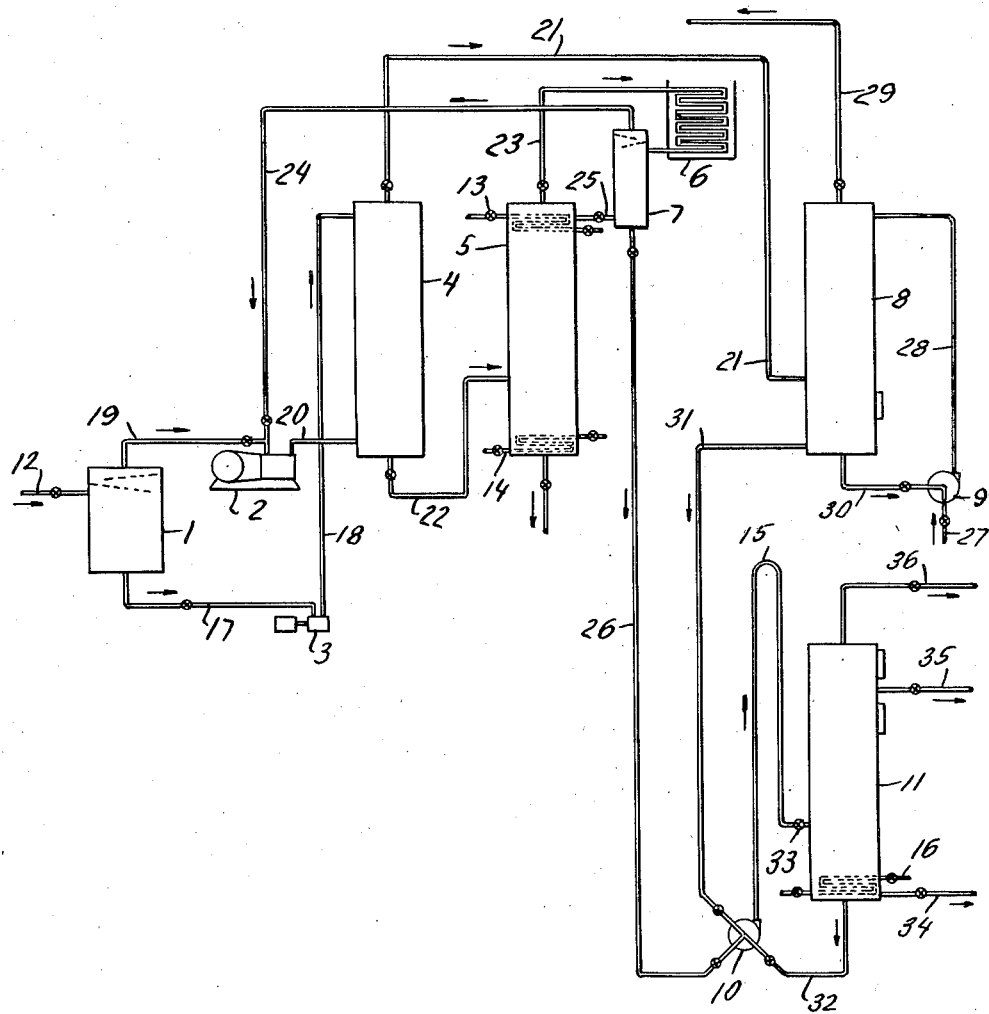
INVENTOR
Frank A. Apgar
BY
Pennie, Davis, Marvin + Edmonds
ATTORNEYS Patented Feb. 23, 1932

1,846,666

UNITED STATES PATENT OFFICE

FRANK A. APGAR, OF HAMMOND, INDIANA, ASSIGNOR TO SINCLAIR REFINING COMPANY, OF NEW YORK, N. Y., A CORPORATION OF MAINE

PRODUCTION OF ALKYL ESTERS OF SULPHURIC ACID

Application filed December 16, 1929. Serial No. 414,362.

This invention relates to improvements in the treatment with sulphuric acid of hydrocarbon gas and vapor mixtures containing unsaturated hydrocarbons, such as butylene and propylene, for the production of alkyl esters of sulphuric acid.

The invention is of special value and application in the treatment of gas and vapor mixtures produced in cracking operations carried out for the production of low boiling hydrocarbon oils, such as gasolene, from higher boiling hydrocarbon oils; particularly in the treatment of gas and vapor mixtures in which the oil undergoing cracking is heated to a high cracking temperature in the vapor phase.

Several advantages are secured by separating the unsaturated hydrocarbon constituents reacting with sulphuric acid to form alkyl esters from the other constituents of the raw gas and vapor mixture prior to treatment with sulphuric acid so that these unsaturated hydrocarbon constituents can be subjected to treatment with sulphuric acid in concentration higher than that in which they occur in the raw gas and vapor mixture. One method of effecting such separation involves treatment of the raw gas and vapor mixture with an absorbent medium for the recovery therein of such unsaturated hydrocarbon constituents from the gas and vapor mixture. The resulting gas and vapor mixture usually still includes a small proportion of unsaturated hydrocarbon constituents reacting with sulphuric acid to form alkyl esters, but the proportion is usually so small that further recovery of these more valuable unsaturated hydrocarbon constituents is economically impossible.

According to the present invention, the sulphuric acid used in the treatment of the separated unsaturated hydrocarbon constituents is first used as an absorbent medium for the further recovery of unsaturated hydrocarbon constituents from the gas and vapor mixture remaining after the primary separation of unsaturated hydrocarbon constituents from the raw gas and vapor mixture. A number of advantages are thus secured.

According to the present invention, the raw gas and vapor mixture containing unsaturated hydrocarbon constituents is subjected to scrubbing treatment with an absorbent medium, a scrubbed gas mixture and a charged absorbent medium are separately taken off from the scrubbing treatment, the scrubbed gas mixture taken off from the the scrubbing treatment is subjected to treatment with sulphuric acid and the unsaturated hydrocarbon constituents taken off from the scrubbing treatment in the charged absorbent are subjected to treatment with sulphuric acid previously used in the just mentioned treatment of the scrubbed gas mixture taken off from the scrubbing treatment. In one aspect, the invention includes the separation of absorbed unsaturated hydrocarbon constituents from the charged absorbed medium taken off from the scrubbing treatment before treatment with sulphuric acid; in another aspect, the invention includes the treatment of the absorbed unsaturated hydrocarbon constituents with sulphuric acid while still in solution in the absorbent medium.

The alkyl esters of sulphuric acid produced in carrying out the present invention may, for example. be hydrolized with water to produce the corresponding alcohols or be treated with metal salts of fatty acids, such for example as sodium acetate, for the production of alkyl esters of such fatty acids.

The invention will be further described in connection with the accompanying drawing which illustrates, diagrammatically and conventionally, one form of apparatus adapted for carrying out one embodiment of the process of the invention.

Referring to the drawing, the apparatus illustrated comprises a receiver 1, a compressor 2, a pump 3, a scrubbing tower 4, a rectifying tower 5, a condenser 6, another receiver 7 connected to the condenser 6, another scrubbing tower 8, a circulating pump 9, a mixing pump 10, and a separating tower 11.

The receiver 1 may be connected, through connection 12, to the condenser of apparatus in which a cracking operation is conducted. For example, the receiver 1 may correspond to the receiver into which the composite distillate and uncondensed gas mixture from a vapor phase cracking apparatus of the type illustrated in application Serial No. 198,621, filed June 13, 1927, by Harry L. Pelzer is discharged and from which gases and liquid are separately withdrawn.

The scrubbing tower 4 may be of any conventional type provided with means for promoting intimate contact between downflowing oil and upflowing vapors and gases. The rectifying tower 5 may be of any conventional type, for example, it may consist of an appropriate number of "bubble" sections. This rectifying tower is shown as provided with a cooling coil 13 and a heating coil 14 for purposes of control. The scrubbing tower 8 may be of any conventional type adapted to handle sulphuric acid provided with means for promoting intimate contact between downflowing acid and upflowing vapors and gases. The mixing pump 10 is arranged to discharge into the separating tower 11 through a conduit 15, the length of which may be adjusted to provide an appropriate period of contact between the reacting materials. The separating tower 11 may be of any conventional type provided with suitable gages for controlling the separation therein and discharge therefrom of the components of the mixture discharged by the mixing pump 10. The separating tower 11 is shown as provided with a cooling coil 16 for purposes of control.

In one way of carrying out the invention in the apparatus illustrated, the condensate-gas-vapor mixture from a cracking operation is discharged into the receiver 1 through connection 12. An initial separation of condensate from uncondensed vapors and gases is effected in this receiver. The receiver may be operated, for example, under a pressure approximating 0–35 pounds per square inch. The condensate separated in the receiver 1 is pumped through connections 17 and 18 by means of pump 3 into the upper end of the scrubbing tower 4, and the gas and vapor mixture separated in the receiver 1 is forced into the lower end of the scrubbing tower 4 through connections 19 and 20 by means of compressor 2. The scrubbing tower 4 may be operated, for example, under a pressure approximating 250–300 pounds per square inch. The scrubbed gas mixture is discharged from the upper end of the scrubbing tower 4 through connection 21 into the lower part of the second scrubbing tower 8. The condensate mixture including constituents absorbed from the gas mixture in the scrubbing tower 4 is discharged through connection 22 into the rectifying tower 5. The rectifying tower 5 may be operated under a pressure approximating that prevailing in the scrubbing tower 4 or under a lower pressure. A gas and vapor mixture containing in high concentration unsaturated hydrocarbon constituents absorbed from the gas mixture subjected to scrubbing treatment in the scrubbing tower 4, but substantially free from gasoline constituents, is discharged from the upper end of the rectifying tower 5 through connection 23 into the condenser 6. The condensate from this condenser is discharged into the receiver 7. Any gas remaining uncondensed is recycled through the scrubbing tower 4 by means of connection 24. A part of the condensate may be reintroduced into the upper end of the rectifying tower 5 through connection 25 for purposes of control. The condensate collecting in the receiver 7, containing unsaturated hydrocarbon constituents in high concentration, is supplied to the mixing pump 10 through connection 26.

In this way of carrying out the invention, the gas and vapor mixture taken off from the primary scrubbing treatment, carried out in the scrubbing tower 4, is supplied to the scrubbing tower 8 through connection 21, and the unsaturated hydrocarbon constituents separated from the gas and vapor mixture subjected to treatment in the primary scrubbing operation, carried out in the scrubbing tower 4, are supplied, in liquefied form, to the mixing pump 10 through connection 26. The sulphuric acid supplied to the mixing pump 10 is first used to scrub the gas mixture supplied to the scrubbing tower 8.

Fresh sulphuric acid is supplied through connection 27 to the circulating pump 9, by means of which this fresh acid, or an acid mixture including this fresh acid, is introduced into the upper end of the scrubbing tower 8 through connection 28. The gas mixture introduced through connection 21 flows upwardly through the upper part of the scrubbing tower 8 in contact with downflowing acid. The acid absorbs particularly the more valuable unsaturated hydrocarbon constituents reacting with sulphuric acid to form alkyl esters, and the remaining gas mixture escapes from the upper end of the scrubbing tower 8 through connection 29. The resulting acid mixture may be recirculated through the scrubbing tower 8 by means of connection 30. As required for treatment of the unsaturated hydrocarbons supplied to the mixing pump 10 through connection 26, the acid mixture collecting in the lower part of the scrubbing tower 8 is supplied to the mixing pump 10 through connection 31. The mixing pump 10 thoroughly mixes these unsaturated hydrocarbons and this acid mixture, and any acid mixture recirculated through connection 32, and forces the mixture through the conduit 15 into the separating tower 11. The separating tower 11 may be operated under a pressure as high as 100–150 pounds per square inch or under higher pressure. The mixture forced through the conduit 15 may be maintained therein under a pressure higher than that prevailing in the separating tower 11 by means of valve 33. The acid mixture or extract accumulating in the separating tower 11 is discharged through connection 34, the oil material remaining immiscible with the acid mixture or acid extract is discharged through connection 35, and any gas mixture remaining is discharged through connection 36.

The formation of alkyl esters of sulphuric acid, in the treatment of the liquefied unsaturated hydrocarbon constituents supplied to the mixing pump 10 through connection 26 with sulphuric acid, is promoted by the use of relatively strong sulphuric acid and the maintenance of relatively low temperatures. Usually the fresh sulphuric acid supplied through connection 27 is advantageously of a strength corresponding to 70-90 per cent. $H_2SO_4$ and the temperature of the mixture discharged from the conduit 15 into the separating tower 11 is advantageously maintained in the neighborhood of 75-80° F. or some lower temperature. The reaction in the conduit 15 may be controlled by regulating the proportion of acid supplied through connection 31, or by regulating the proportion of acid supplied through connection 31 and the proportion of recirculated acid supplied through connection 32. The reaction may be further controlled, where acid is recirculated through connection 32, by cooling the acid mixture collecting in the lower part of the separating tower 11 by means of the cooling coil 16. The conditions maintained in the scrubbing tower 8 usually are not critical. Fresh sulphuric acid may be supplied to the scrubbing tower 8 through connection 27 at a temperature in the neighborhood of 70-80° F., for example, and this tower may be operated under pressure up to 50-150 pounds per square inch or under higher pressure, for example.

The operation of the scrubbing tower 4 and the rectifying tower 5, using the gasolene condensate separated in the receiver 1 as an absorbent medium, as just described, is also described in application Serial Number 414,419 filed December 16, 1929, by Eugene C. Herthel.

In another way of carrying out the present invention, some other absorbent medium, a gas oil for example, may be used in the scrubbing tower 4 and the absorbed unsaturated hydrocarbon constituents separated from this other absorbent medium by distillation and then subjected to treatment with sulphuric acid in accordance with the invention. If some absorbent other than a condensate from which the raw gas and vapor mixture is separated is used, the scrubbing treatment carried out in scrubbing tower 4 may be carried out under atmospheric pressure, although the scrubbing treatment is promoted by carrying it out under relatively high pressure.

In still another way of carrying out the present invention, an acid resistant absorbent medium may be used in the scrubbing treatment effecting the primary separation of unsaturated hydrocarbon constituents from the raw gas and vapor mixture and the absorbed unsaturated hydrocarbon constituents treated while still in solution in the absorbent medium, as described in application Serial Number 245,268, filed January 7th, 1928, by Eugene C. Herthel, with sulphuric acid previously used in the treatment of the scrubbed gas mixture remaining after the primary separation of unsaturated hydrocarbon constituents.

I claim:

1. In the treatment of hydrocarbon gas and vapor mixtures containing unsaturated hydrocarbons for the production of alkyl esters of sulphuric acid, the improvement which comprises subjecting the gas and vapor mixture to scrubbing treatment with an absorbent medium, separately taking off from the scrubbing treatment a scrubbed gas mixture and a charged absorbent medium, separating unsaturated hydrocarbons absorbed by the absorbent medium from the gas and vapor mixture in the scrubbing treatment from the charged absorbent medium taken off from the scrubbing treatment, and subjecting the said scrubbed gas mixture taken off from the scrubbing treatment to treatment with sulphuric acid and subjecting the said unsaturated hydrocarbons separated from the charged absorbent medium taken off from the scrubbing treatment to treatment with sulphuric acid previously used in the just mentioned treatment of the scrubbed gas mixture taken off from the scrubbing treatment.

2. In the treatment of hydrocarbon gas and vapor mixtures containing unsaturated hydrocarbons for the production of alkyl esters of sulphuric acid, the improvement which comprises subjecting the gas and vapor mixture to scrubbing treatment with an absorbent medium, separately taking off from the scrubbing treatment a scrubbed gas mixture and a charged absorbent medium, and subjecting the said scrubbed gas mixture taken off from the scrubbing treatment to treatment with sulphuric acid and subjecting the said unsaturated hydrocarbons taken off from the scrubbing treatment in the charged absorbent medium to treatment with sulphuric acid previously used in the just mentioned treatment of the scrubbed gas mixture taken off from the scrubbing treatment.

In testimony whereof I affix my signature.

FRANK A. APGAR.